UNITED STATES PATENT OFFICE.

OSCAR GÜNTHER AND LEOPOLD HESSE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

13,122. Specification of Reissued Letters Patent. Reissued June 14 1910.

No Drawing. Original No. 921,239, dated May 11, 1909, Serial No. 477,284. Application for reissue filed December 10, 1909. Serial No. 532,507.

*To all whom it may concern:*

Be it known that we, OSCAR GÜNTHER and LEOPOLD HESSE, doctors of philosophy, chemists, citizens of the German Empire, residing at Elberfeld, Germany, Kingdom of Prussia, have invented new and useful Improvements in New Azo Dyes, of which the following is a specification.

Our invention relates to the manufacture and production of new coloring matters capable of dyeing wool.

The new dyestuffs are obtained by combining in acid solution the diazo compound of para-nitranilin-ortho-sulfonic acid with naphthalene compounds having the formula:

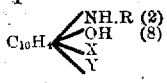

(R meaning hydrogen or a substituent, X and Y meaning hydrogen or a sulfonic group).

The new products possess the valuable property that they produce on wool pure violet to black shades fast to light and to washing and possessing excellent level-dyeing properties.

The new dyestuffs are after being dried and pulverized in the shape of their alkaline salts dark powders soluble in water generally with a red to violet color. They yield upon reduction with stannous chlorid and hydrochloric acid para-phenylenediamin-sulfonic acid and naphthalene diamins having the general formula:

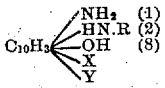

(X, Y and R having the above-given meaning).

In carrying out our new process practically, we can proceed as follows, the parts being by weight:

Example: 235 parts of para-nitranilin-ortho-sulfonic acid (ammonium salt) are diazotized by means of 69 parts of sodium nitrite and 550 parts of a 20 per cent. hydrochloric acid, the diazo compound is introduced into a suspension of 239 parts of 2.8-aminonaphthol-6-sulfonic acid showing slightly acid reaction. The dyestuff is precipitated by the addition of common salt, filtered off and dried. It is in the shape of its sodium salt a reddish-brown powder soluble in water with a reddish-violet color and soluble in concentrated sulfuric acid with an orange color. The new dye yields upon reduction with stannous chlorid and hydrochloric acid para-phenylene-diamin-sulfonic acid and 1.2-diamino-8-naphthol-6-sulfonic acid. It dies wool reddish-violet shades fast to light and to washing.

It dyes wool reddish-violet shades fast to light and to washing.

In the following table the shades of some of the new dyes are given:

| Dyestuff obtained from para-nitranilin-ortho-sulfonic acid. | Dyes wool: |
|---|---|
| 2.8-aminonaphthol | Reddish-blue. |
| 2.8-aminonaphthol-6-sulfonic acid | Reddish-violet. |
| Ethyl-2-amino-8-naphthol-6-sulfonic acid | Bluish-violet. |
| Phenyl-2-amino-8-naphthol-6-sulfonic acid | Blue-black. |
| Para-anisidyl-2-amino-8-naphthol-6-sulfonic acid | Green-black. |
| 2.8-aminonaphthol-3.6-disulfonic acid | Violet. |

Having now described our invention and in what manner the same is to be performed, what we claim as new and desire to secure by Letters Patent is:

1. The herein-described new azo dyestuffs, obtainable from para-nitranilin-ortho-sulfonic acid and naphthalene compounds of the above-given formula in acid solution, which dyestuffs are, after being dried and pulverized in the shape of their alkaline salts dark powders soluble in water generally with a red to violet color; yielding upon reduction with stannous chlorid and hydrochloric acid para-phenylenediamin-sulfonic acid and diamino-naphthols having the above-given formula; and dyeing wool from violet to black shades, substantially as described.

2. The herein-described new azo dyestuff, obtainable from para-nitranilin-ortho-sulfonic acid and 2.8 amino-naphthol-6-sulfonic acid in acid solution, which dyestuff is, after being dried and pulverized in the shape of its sodium salt a reddish-brown powder soluble in water with a reddish-violet color and soluble in concentrated sulfuric acid with an orange color; yielding upon reduction with stannous chlorid and hydrochloric acid para-phenylenediamin-sulfonic acid and 1.2-diamino-8-naphthol-6-sulfonic acid; and dyeing wool reddish-violet shades fast to light and to washing, substantially as described.

In testimony whereof we have hereunto set our hands in the presence of two subscribing witnesses.

OSCAR GÜNTHER. [L. S.]
LEOPOLD HESSE. [L. S.]

Witnesses:
OTTO KÖNIG,
CHAS. J. WRIGHT.